(12) United States Patent
Gillespie et al.

(10) Patent No.: US 9,858,421 B2
(45) Date of Patent: Jan. 2, 2018

(54) SYSTEMS AND METHODS FOR DETECTING HARDWARE TAMPERING OF INFORMATION HANDLING SYSTEM HARDWARE

(71) Applicant: Dell Products L.P., Round Rock, TX (US)

(72) Inventors: Kurt D. Gillespie, Pflugerville, TX (US); Gregory S. Hudgins, Round Rock, TX (US); David Wade Smith, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 579 days.

(21) Appl. No.: 14/322,041

(22) Filed: Jul. 2, 2014

(65) Prior Publication Data

US 2016/0004867 A1  Jan. 7, 2016

(51) Int. Cl.
*G06F 9/00* (2006.01)
*G06F 15/177* (2006.01)
*G06F 21/57* (2013.01)
*G06F 9/44* (2006.01)

(52) U.S. Cl.
CPC .......... *G06F 21/575* (2013.01); *G06F 9/4401* (2013.01)

(58) Field of Classification Search
CPC ...... G06F 21/57; G06F 21/575; G06F 21/572; G06F 21/44; G06F 21/602; G06F 21/00; G06F 21/445; G06F 21/86; G06F 21/88; G06F 2211/009; G06F 2221/034; H04W 12/10; H04W 12/06; H04L 63/0876; H04L 2209/127

See application file for complete search history.

(56) References Cited

U.S. PATENT DOCUMENTS

| | | | | |
|---|---|---|---|---|
| 7,681,247 B2* | 3/2010 | Williams | ............... | G06F 21/73 365/200 |
| 2007/0266256 A1* | 11/2007 | Shah | ..................... | G06F 21/725 713/178 |
| 2009/0119221 A1* | 5/2009 | Weston | ............... | G06Q 20/382 705/76 |

(Continued)

*Primary Examiner* — Thomas Lee
*Assistant Examiner* — Zhipeng Wang
(74) *Attorney, Agent, or Firm* — Jackson Walker L.L.P.

(57) ABSTRACT

A method comprising may include storing, in a BIOS comprising a program of instructions executable by the processor and configured to cause the processor to initialize one or more information handling resources of an information handling system, a hardware profile of the information handling system, the hardware profile comprising identifying information of one or more information handling resources of the information handling system recorded during creation of the hardware profile. The method may also include, during a boot of the information handling system in a hardware verification mode, creating a new hardware profile comprising identifying information of the one or more information handling resources, comparing the new hardware profile to the hardware profile stored in the BIOS, and if the new hardware profile differs from the hardware profile stored in the BIOS, issuing an alert indicating potential tampering with hardware of the information handling system after creation of the profile.

15 Claims, 2 Drawing Sheets

(56) References Cited

U.S. PATENT DOCUMENTS

| | | | |
|---|---|---|---|
| 2011/0099361 A1* | 4/2011 | Shah | H04W 12/10 |
| | | | 713/2 |
| 2012/0079332 A1* | 3/2012 | Doumenjou | G01R 31/31719 |
| | | | 714/726 |
| 2013/0125244 A1* | 5/2013 | Sugano | G06F 21/44 |
| | | | 726/26 |
| 2015/0074764 A1* | 3/2015 | Stern | H04L 63/06 |
| | | | 726/4 |
| 2016/0247002 A1* | 8/2016 | Grieco | G06F 21/86 |

* cited by examiner

SYSTEMS AND METHODS FOR DETECTING HARDWARE TAMPERING OF INFORMATION HANDLING SYSTEM HARDWARE

TECHNICAL FIELD

The present disclosure relates in general to information handling systems, and more particularly to detecting tampering of information handling system hardware occurring while a secure chain of custody can not be ensured, one of many cases being between manufacturing of the information handling system to its delivery to an intended end user.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many consumers of information handling resources are increasingly demanding that manufacturers of information handling systems provide verifiable assurances that an information handling system ordered from the manufacturer has not been tampered with prior to receipt by the customer, or after delivery by a malicious entity. For example, without security measures in place, an interloper (e.g., a government intelligence agency, business competitor, or other person with harmful intent) could possibly intercept an information handling system during transit, and replace hardware and software components of the information handling system with malicious components intended to mimic the replaced components while performing some malicious operation (e.g., snooping data, data corruption, or communications of the information handling system). While many approaches have been employed (e.g., Trusted Platform Module) to ensure security of software during transit from manufacturer to intended end user, the industry still lacks an effective approach for providing such security with respect to hardware components.

SUMMARY

In accordance with the teachings of the present disclosure, the disadvantages and problems associated with ensuring security of an information handling system during transit to an intended end user may be reduced or eliminated.

In accordance with these and other embodiments of the present disclosure, an information handling system may include a processor and a basic input/output system (BIOS). The BIOS may comprise a program of instructions executable by the processor and configured to cause the processor to initialize one or more information handling resources of the information handling system. The BIOS may be further configured to store a hardware profile of the information handling system, the hardware profile comprising identifying information of one or more information handling resources of the information handling system recorded during creation of the hardware profile. The BIOS may also be configured to, during a boot of the information handling system in a hardware verification mode, create a new hardware profile comprising identifying information of the one or more information handling resources, compare the new hardware profile to the hardware profile stored in the BIOS, and if the new hardware profile differs from the hardware profile stored in the BIOS, issue an alert indicating potential tampering with hardware of the information handling system since creation of the hardware profile.

In accordance with these and other embodiments of the present disclosure, a method comprising may include storing, in a basic input/output system (BIOS) comprising a program of instructions executable by the processor and configured to cause the processor to initialize one or more information handling resources of an information handling system, a hardware profile of the information handling system, the hardware profile comprising identifying information of one or more information handling resources of the information handling system recorded during creation of the hardware profile. The method may also include, during a boot of the information handling system in a hardware verification mode, creating a new hardware profile comprising identifying information of the one or more information handling resources, comparing the new hardware profile to the hardware profile stored in the BIOS, and if the new hardware profile differs from the hardware profile stored in the BIOS, issuing an alert indicating potential tampering with hardware of the information handling system after creation of the hardware profile.

In accordance with these and other embodiments of the present disclosure, an article of manufacture may include a computer readable medium and computer-executable instructions carried on the computer readable medium. The instructions may be readable by a processor, the instructions, when read and executed, for causing the processor to store, in a basic input/output system (BIOS) comprising a program of instructions executable by the processor and configured to cause the processor to initialize one or more information handling resources of an information handling system, a hardware profile of the information handling system, the hardware profile comprising identifying information of one or more information handling resources of the information handling system recorded during creation of the hardware profile. The instructions may also be configured to cause the processor to, during a boot of the information handling system in a hardware verification mode, create a new hardware profile comprising identifying information of the one or more information handling resources, compare the new hardware profile to the hardware profile stored in the BIOS, and if the new hardware profile differs from the hardware profile stored in the BIOS, issue an alert indicating potential tampering with hardware of the information handling system after creation of the hardware profile.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
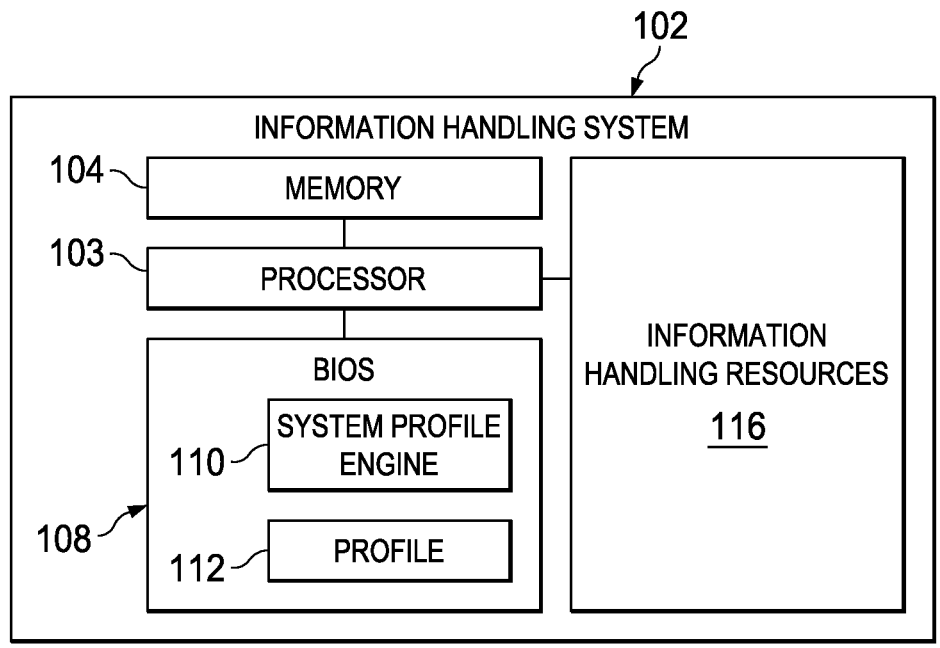
FIG. 1 illustrates a block diagram of an example information handling system, in accordance with embodiments of the present disclosure.
Figure 2:
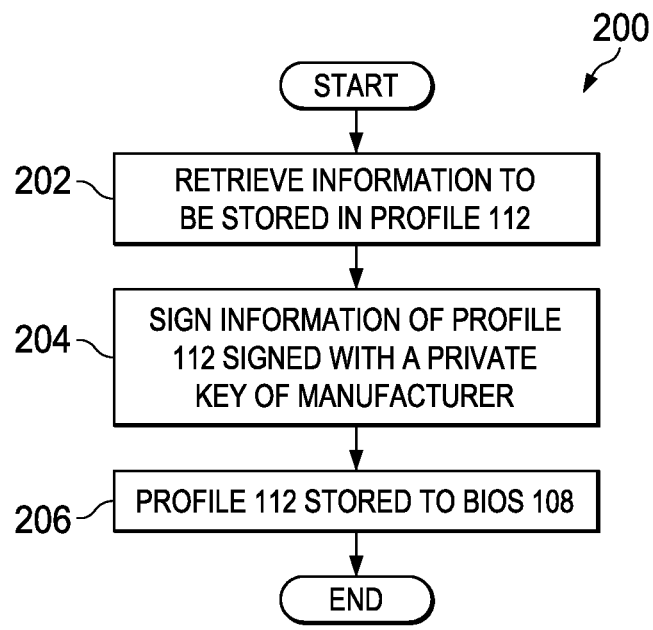
FIG. 2 illustrates a flow chart of an example method for storing a hardware profile for an information handling system prior to the information handling system being exposed to a non-security environment, in accordance with embodiments of the present disclosure.
Figure 3:
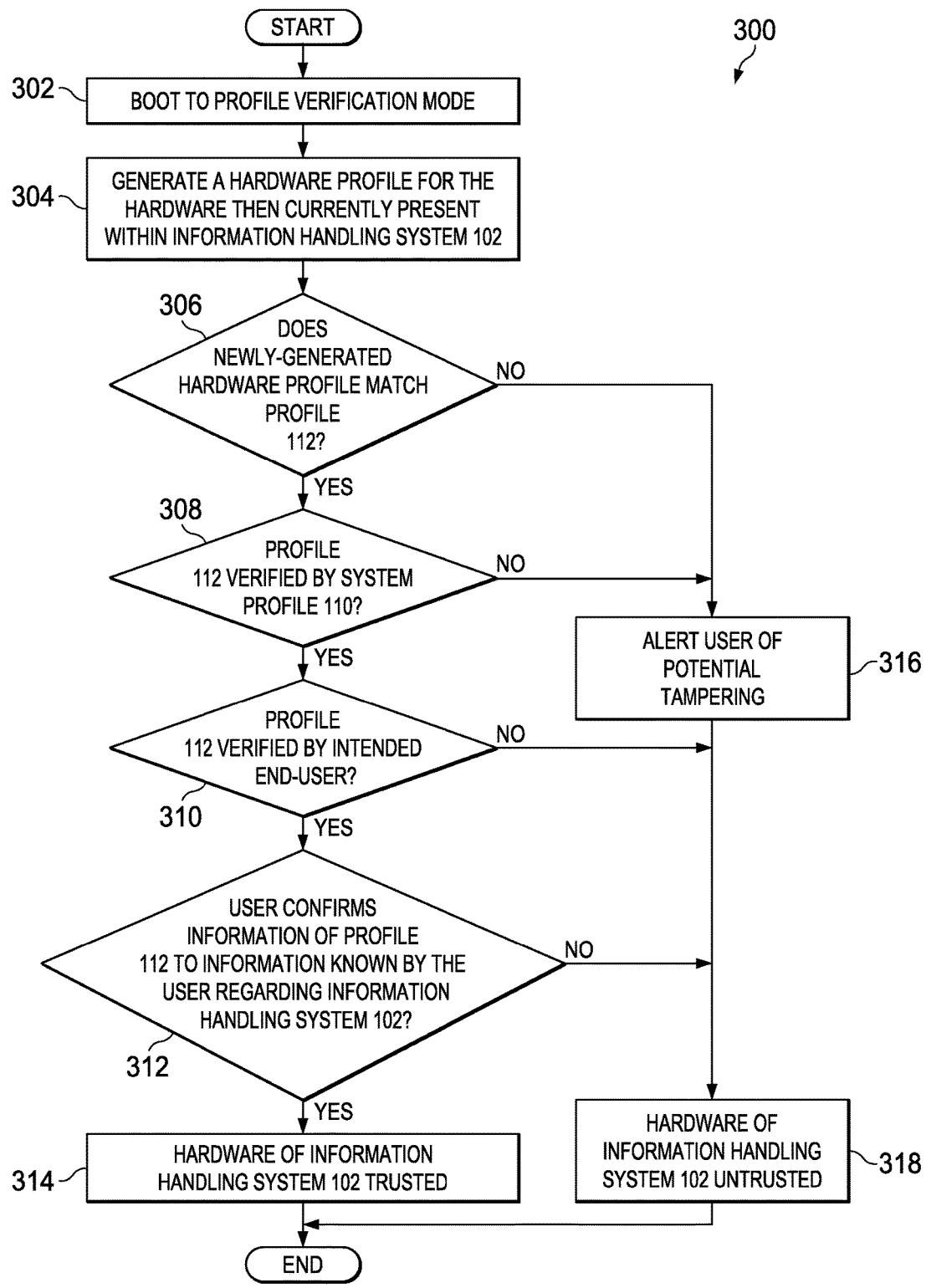
FIG. 3 illustrates a flow chart of an example method for verifying whether hardware of an information handling system experienced tampering during transit of the information handling system from a manufacturer to an intended end user, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a processor 103, a memory 104 communicatively coupled to processor 103, and a basic input/output system (BIOS) 108 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, BIOS 108, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 108 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 108 may be implemented as a program of instructions that may be read by and executed on processor 103 to carry out the functionality of BIOS 108. In these and other embodiments, BIOS 108 may comprise boot firmware configured to be the first code executed by processor 103 when information handling system 102 is booted and/or powered on. As part of its initialization functionality, code for BIOS 108 may be configured to set components of information handling system 102 into a known state, so that one or more applications (e.g., operating system 106 or other application programs) stored on compatible media (e.g., memory 104) may be executed by processor 103 and given control of information handling system 102.

As shown in FIG. 1, BIOS 108 may include a system profile engine 110. As described in greater detail elsewhere in this disclosure, system profile engine 110 may include any system, device, or apparatus configured to, during execution of BIOS 108, create a hardware profile 112 for information handling system 102 after its manufacture and before delivery to an intended end user, and/or to verify whether hardware of an information handling system 102 experienced tampering during transit of the information handling system from a manufacturer to an intended end user In some embodiments, system profile engine 110 may be implemented as a program of instructions that may be read by and executed on processor 103 to carry out the functionality of system profile engine 110.

As shown in FIG. 1, BIOS 108 may also include a profile 112 (e.g., stored in a non-volatile computer readable medium integral to or otherwise accessible by BIOS 108). Profile 112 may include identifying information of one or more components of hardware (e.g., processor 103, memory 104, BIOS 108, other information handling resources 116, etc.). In some embodiments, such identifying information may include information that would be difficult for an interloper to mimic without expending significant amounts of time and/or resources. For example, profile 112 may include static data which have unique and unchanging values for each information handling system 102, such as a unique identifier (e.g., serial number or service tag) of information handling system 102, unique identifiers (e.g., serial numbers) of memory modules (e.g. dual-inline memory modules) or memory 104 installed in information handling system 102 by the manufacturer, unique identifiers (e.g., media access control addresses) of network interface cards installed in information handling system 102 by the manufacturer, and/or any other suitable uniquely identifying characteristic of processor 103, memory 104, BIOS 110, and/or another information handling resource 116 of information handling system 102.

Profile 112 may additionally or alternatively include acceptable ranges and/or acceptable values for one or more operating parameters unique to information handling system 102. As an example, such information could include voltage levels, electrical resistance levels, and/or other electrical values associated with an information handling resource 116 of information handling system 102, the amount of memory 104 reserved by processor 103 at the time of creation of profile 112, or any other suitable value. Accordingly, tampering may be detected at verification if any of these values differ by more than manufacturing or operating tolerances from the values measured during creation of profile 112. As a specific example, if an interloper were to replace an information handling resource with a component mimicking the replaced information handling resource, the replacement component may operate with different electrical parameters (e.g., voltage, resistance, etc.), thus indicating tampering.

In these and other embodiments, profile 112 may build on a software core root of trust provided by a trusted platform module or other cryptoprocessor by storing values of platform configuration registers (PCRs) and/or other data registers present at the time profile 112 is created, which may later be compared to values of the same registers during a verification to determine if tampering has occurred.

Generally speaking, information handling resources 116 may include any component system, device or apparatus of information handling system 102, including without limitation processors, buses, computer-readable media, input-output devices and/or interfaces, storage resources, network interfaces, motherboards, electro-mechanical devices (e.g., fans), displays, and/or power supplies.

FIG. 2 illustrates a flow chart of an example method 200 for storing a hardware profile 112 for information handling system 102 prior to information handling system 102 being exposed to a non-security environment, in accordance with embodiments of the present disclosure. According to one embodiment, method 200 may begin at step 202. As noted above, teachings of the present disclosure may be implemented in a variety of configurations of information handling system 102.

At step 202, once manufacture of information handling system 102 is complete (e.g., when all software and hardware components have been installed and configured according to an order of an intended end user), system profile engine 110 of BIOS 108 may execute (e.g., during a special-purpose boot process of information handling system 102) in order to retrieve information to be stored in profile 112 and store such information (e.g., in a non-volatile computer-readable medium integral to or accessible by system profile engine 110).

At step 204, the information of profile 112 may be signed with a private key of the manufacturer. In some embodiments, such signing may be performed by system profile engine 110. In these and other embodiments, system profile engine 110 may deliver the unsigned key to a key management server (not shown) which signs the profile information and profile 112 and delivers signed profile 112 back to information handling system 102.

At step 206, system profile engine 110 or another component of information handling system 102 may store signed profile 112 in BIOS 108. After completion of step 206, information handling system 102 may be delivered by any mix of trusted or untrusted entities prior to its final intended destination.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

In transit between the manufacturer and the intended end user, information handling system 102 is susceptible to attack from potential interlopers. Accordingly, it may be desirable to verify whether or not such an attack has occurred.

FIG. 3 illustrates a flow chart of an example method 300 for verifying whether hardware of information handling system 102 experienced tampering during transit of the information handling system from a manufacturer to an intended end user, in accordance with embodiments of the present disclosure. According to one embodiment, method 300 may begin at step 302. As noted above, teachings of the present disclosure may be implemented in a variety of configurations of information handling system 102.

At step 302, the intended end user may, after receipt of information handling system 102 and prior to customizing or otherwise modifying information handling system 102 (which could trigger a false indication of tampering), the end user could choose to boot to a profile verification mode. For example, the end user could trigger such boot by entering a specific keystroke or giving some other indication through a user interface of information handling system 102 that the user desires to enter such profile verification mode.

At step 304, during the profile verification mode, system profile engine 110 or another component of BIOS 108 may generate a hardware profile for the hardware then currently present within information handling system 102, in a manner similar to step 202 of method 200. At step 306, system profile engine 110 or another component of BIOS 108 may compare this newly-created profile to profile 112 stored to BIOS 110 prior to delivery of information handling system 102. If the newly-created profile matches profile 112, method 300 may proceed to step 310. Otherwise, method 300 may proceed to step 316.

At step 308, to ensure that information handling system 102 was not intercepted and code of BIOS 108 simply changed to circumvent the security measures described above, system profile engine 110 or another component of BIOS 108 may verify profile 112 a public key published by the manufacturer (e.g., the public key corresponding to the private key used to sign profile 112). If profile 112 is verified, method 300 may proceed to step 310. Otherwise, method 300 may proceed to step 316.

At step 310, to further ensure that information handling system 102 was not intercepted and code of BIOS 108 simply changed to circumvent the security measures described above, the intended end user may, in addition to the verification performed by BIOS 108 in step 308, verify profile 112 with a public key published by the manufacturer (e.g., the public key corresponding to the private key used to sign profile 112). In some embodiments, this may be performed by the intended end user retrieving profile 112 from information handling system 102 and verifying profile 112 using a separate information handling system. If profile 112 is verified, method 300 may proceed to step 312. Otherwise, method 300 may proceed to step 318.

At step 312, to provide additional assurance of no tampering, some data within profile 112 (e.g., a unique identifier of information handling system 102) may be presented by BIOS 108 or made readable to the end user so that the user may compare such information to information known by the user regarding information handling system 102. This may provide assurance that a valid signed profile 112 was not replicated or reused in more than one information handling system 102. If the end user verifies the profile information is valid, method 300 may proceed to step 314. Otherwise, method 300 may proceed to step 318.

At step 314, as a result of passing the verification steps of 304-312, the end user may trust that information handling system 102 was free of hardware tampering during its transit from the manufacturer. After step 314, method 300 may end.

At step 316, in response to determining that a newly-created post-delivery hardware profile of information handling system 102 does not match that of pre-delivery profile 112, system profile engine 110 or another component of BIOS 108 may communicate an alert to the end user that hardware tampering of information handling system 102 may have occurred during transit.

At step 318, as a result of failing any of the verification steps of 304-312, the end user may distrust that information handling system 102 was free of hardware tampering during its transit from the manufacturer. After step 318, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

Although the methods and systems above contemplate a hardware profile 112 stored to an information handling system 102 by a manufacturer, methods and similar identical and similar to those described herein may also be used such that after an intended end-user customizes and/or configured an information handling system, the end user could perform steps similar those disclosed herein to create a hardware profile 112 such that the end user could ensure that no tampering has occurred after the user's customization and/or configuration.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
 a processor; and
 a basic input/output system (BIOS) comprising a program of instructions executable by the processor and configured to cause the processor to initialize one or more information handling resources of the information handling system, wherein the BIOS is further configured to:
  store, signed with a private key, a hardware profile of the information handling system, the hardware profile comprising identifying information of one or more information handling resources of the information handling system recorded during creation of the hardware profile; and during a boot of the information handling system in a hardware verification mode:
create a new hardware profile comprising identifying information of the one or more information handling resources;
compare the new hardware profile to the hardware profile stored in the BIOS; and
if the new hardware profile differs from the hardware profile stored in the BIOS, issue an alert indicating potential tampering with hardware of the information handling system after creation of the hardware profile;
wherein at least a portion of the identifying information in the hardware profile is accessible by an intended end user of the information handling system for comparison to known information to determine if the information handling system was free of hardware tampering after creation of the hardware profile.

2. The information handling system of claim 1, wherein the private key is of a manufacturer of the information handling system.

3. The information handling system of claim 1, wherein the hardware profile is stored in a manner such that it is retrievable by the intended end user and verifiable via a public key corresponding to the private key in order to determine if the information handling system was free of hardware tampering after creation of the hardware profile.

4. The information handling system of claim 1, wherein the boot in the hardware verification mode is configured to occur only a first time that the information handling system is booted after delivery to the intended end user.

5. The information handling system of claim 1, wherein the hardware profile is created by a manufacturer of the information handling system prior to delivery of the information handling system to the intended end user.

6. A method comprising:
storing, signed with a private key, in a basic input/output system (BIOS) comprising a program of instructions executable by a processor and configured to cause the processor to initialize one or more information handling resources of an information handling system, a hardware profile of the information handling system, the hardware profile comprising identifying information of one or more information handling resources of the information handling system recorded during creation of the hardware profile; and
during a boot of the information handling system in a hardware verification mode:
creating a new hardware profile comprising identifying information of the one or more information handling resources;
comparing the new hardware profile to the hardware profile stored in the BIOS; and
if the new hardware profile differs from the hardware profile stored in the BIOS, issuing an alert indicating potential tampering with hardware of the information handling system after creation of the hardware profile;
wherein at least a portion of the identifying information in the hardware profile is accessible by an intended end user of the information handling system for comparison to known information to determine if the information handling system was free of hardware tampering after creation of the hardware profile.

7. The method of claim 6, wherein the private key is of a manufacturer of the information handling system.

8. The method of claim 6, further comprising storing the hardware profile in a manner such that it is retrievable by the intended end user and verifiable via a public key corresponding to the private key in order to determine if the information handling system was free of hardware tampering after creation of the hardware profile.

9. The method of claim 6, wherein the boot in the hardware verification mode occurs only a first time that the information handling system is booted after delivery to the intended end user.

10. The method of claim 6, wherein the hardware profile is created by a manufacturer of the information handling system prior to delivery of the information handling system to the intended end user.

11. An article of manufacture comprising:
a non-transitory computer readable medium; and
computer-executable instructions carried on the computer readable medium, the instructions readable by a processor, the instructions, when read and executed, for causing the processor to:
store, signed with a private key, in a basic input/output system (BIOS) comprising a program of instructions executable by the processor and configured to cause the processor to initialize one or more information handling resources of an information handling system, a hardware profile of the information handling system, the hardware profile comprising identifying information of one or more information handling resources of the information handling system recorded during creation of the hardware profile; and
during a boot of the information handling system in a hardware verification mode:
create a new hardware profile comprising identifying information of the one or more information handling resources;
compare the new hardware profile to the hardware profile stored in the BIOS; and
if the new hardware profile differs from the hardware profile stored in the BIOS, issue an alert indicating potential tampering with hardware of the information handling system after creation of the hardware profile;
wherein at least a portion of the identifying information in the hardware profile is accessible by an intended end user of the information handling system for comparison to known information to determine if the information handling system was free of hardware tampering after creation of the hardware profile.

12. The article of claim 11, wherein the private key is of a manufacturer of the information handling system.

13. The article of claim 11, the instructions for further causing the processor to store the signed hardware profile in a manner such that it is retrievable by the intended end user and verifiable via a public key corresponding to the private key in order to determine if the information handling system was free of hardware tampering after creation of the hardware profile.

14. The article of claim 11, wherein the boot in the hardware verification mode is configured to be initiated based on a command received from the intended end user.

15. The article of claim 11, wherein the hardware profile is created by a manufacturer of the information handling system prior to delivery of the information handling system to the intended end user.

* * * * *